United States Patent [19]
Schinke et al.

[11] Patent Number: 5,244,411
[45] Date of Patent: Sep. 14, 1993

[54] ELECTRICAL APPLIANCE

[75] Inventors: Horst Schinke, Kronberg/Ts.; Robert Jung, Friedberg, both of Fed. Rep. of Germany

[73] Assignee: Braun Aktiengesellschaft, Frankfurt, Fed. Rep. of Germany

[21] Appl. No.: 833,507

[22] Filed: Feb. 11, 1992

[30] Foreign Application Priority Data

Feb. 18, 1991 [DE] Fed. Rep. of Germany ....... 4104884

[51] Int. Cl.$^5$ ............................................. H02J 7/00
[52] U.S. Cl. ..................... 439/516; 429/97; 439/500; 439/568; 439/911
[58] Field of Search ............. 320/2; 429/97; 439/516, 439/568, 911, 500, 52, 53

[56] References Cited

U.S. PATENT DOCUMENTS

| | | |
|---|---|---|
| 3,458,794 | 7/1969 | Bohnstedt ............................. 320/2 |
| 4,467,263 | 8/1984 | Conforti ................................ 320/2 |
| 4,977,042 | 12/1990 | Chiyajo et al. ...................... 429/49 |

FOREIGN PATENT DOCUMENTS

| | | |
|---|---|---|
| 3025159 | 7/1980 | Fed. Rep. of Germany . |
| 3304045 | 2/1983 | Fed. Rep. of Germany . |
| 2195938 | 6/1990 | United Kingdom . |

Primary Examiner—Neil Abrams
Attorney, Agent, or Firm—Fish & Richardson

[57] ABSTRACT

An electrical appliance includes housing structure for accommodating a drive motor and at least one rechargeable storage cell cooperating with the drive motor. A storage cell charging circuitry and appliance plug structure are provided on the appliance, the appliance plug structure includes a connector base with a receiving aperture in which contact pins are provided for engagement with a mating connector of a power cord supplying electrical power to the storage cell. The connector base is rotatably mounted, serving to locate the housing structure on the appliance and to interrupt the supply of power from the contact pins to the storage cell charging circuitry prior to disassembly of the appliance.

20 Claims, 5 Drawing Sheets

ELECTRICAL APPLIANCE

This invention relates to an electrical appliance comprising a housing structure for accommodating at least one functional component and at least one rechargeable storage cell cooperating with the functional component, a storage cell charging circuitry as well as an appliance plug provided on the appliance and comprising a connector base having a receiving aperture in which contact pins are provided for positive engagement with a mating connector of a power cord supplying electrical power to the storage cell.

Electrical appliances of this type operated by means of rechargeable storage cells including, for example, electric shavers, toothbrushes, screwdrivers, drills, flashlights, etc., are widely used in practice. For recharging the storage cells, these electrical appliances are equipped with an appliance plug standardized for safety reasons, its receiving aperture being adapted to receive in positive engagement therewith an equally standardized connector of a power cord for supplying a line voltage. The utility of such electrical appliances is very high, because the storage cells can be recharged very frequently. After each charging operation, a fully functional electrical appliance is available which can then be used without being connected to a power cord. The storage cell charging circuitry of such electrical appliances frequently includes further electric components ensuring operation of the electrical appliance directly on the supply line, irrespective of the charging condition of the storage cells.

As is known, the useful life of rechargeable storage cells is limited. Therefore, electrical appliances equipped with rechargeable storage cells should be constructed with a view to allowing safe removal of spent storage cells.

It is an object of the present invention to configure an electrical appliance of the type initially referred to in such a manner that the rechargeable storage cells can be readily removed from the electrical appliance, without involving the risk for the operator to come in contact with the dangerous line voltage.

According to the present invention, this object is accomplished in an appliance of the type initially referred to in that the connector base and/or the contact pins are rotatably mounted, that latching elements cooperating with a detachable housing structure or housing portion are provided on the connector base, and that means are provided for interrupting a power supply lead arranged in the housing structure.

This provides a simple way of varying the positions of the connector base, one position serving to locate the detachable housing portion on the appliance, another position serving to unlock the detachable housing portion so that it can be withdrawn from the appliance for removal of the storage cells. Also, power can be interrupted simply by rotating the connector base, thus precluding any possibility for the operator to come in contact with the dangerous line voltage.

For this purpose, the connector base is advantageously received in the housing structure of the appliance so as to be rotatable relative to the contact pins, the contact pins being fixedly disposed on a plug mounting structure and connected to the storage cell or cells by means of at least one terminal lug having a rupture joint. The individual terminal lugs being provided with rupture joints, the use of a slight rotating motion of the connector base will cause the terminal lug to be severed readily, interrupting any further supply of power to the storage cells. Only specifically trained personnel will then be in a position to restore operation of the appliance. In this manner, any hazard to the operator is eliminated, because the appliance cannot be set to work again, not even if the connector is inserted in the appliance.

According to another possibility disclosed in a further development of the device of the invention, the appliance is formed of a housing frame, at least one housing structure adapted to be mounted on the housing frame, and a housing portion completing the housing structure, wherein the housing structure and/or the housing frame serve the function of receiving the connector base and the plug mounting structure. It is a further advantage that part of the housing structure is configured as a shell adapted to be slipped onto the housing frame until its abutment with an abutment wall provided on the housing structure or the housing frame, that the housing portion has approximately the same outer contour as the shell, is of a cup-shaped configuration, includes an opening for receiving a connector and is adapted to be attached to the bottom end of the shell.

It is of particular relevance to the present invention that the cup-shaped housing portion has on its one side a freely extending wall member of a width somewhat reduced compared to that of the side, the wall member being insertable into an elongate cutout provided in the one side of the housing.

In a further advantageous embodiment of the invention, there is provided at the bottom end of the frame a cutout open on one side, having an at least partially annular groove for receiving the plug mounting structure with the two fixed contact pins and for receiving in a rotatable relationship thereto an annular shoulder of the connector base, the connector base being rotatable within limits relative to an annular step fixedly arranged on the plug mounting structure, the connector base further being of a cylindrical configuration and having on its circumferential outer surface at least one latching tab. Moreover, it is an advantage that a locking plate is seatable on the circumferential outer surface of the connector base, the plate having at least one opening which is enlarged such as to enable the locking plate to be slipped with its opening and the enlargement over the latching tab, to be subsequently located in position behind the latching tab using a rotating motion of the connector base and/or the locking plate.

This provides a simple way of exposing the compartment in which the storage cells are received, because removal of the storage cells only requires the connector base to be rotated through an angle of about 90° or until the receiving aperture conformed to the appliance plug intersects with its two longitudinal sides the plane extending through the two contact pins at right angles. In this position, the two terminal lugs connected to the contact pins are severed. Also, the latching tabs are in the area of the enlargement of the opening provided in the locking plate, thus enabling the locking plate to be removed together with the cup-shaped bottom part of the housing. As a final step, only the shell-type housing or housing portion has to be withdrawn from the frame to expose the storage cells which can then be removed.

To be able to resume operation of the appliance, it is only necessary to replace the terminal lugs and the storage cells which is done at a specialized dealer's.

Following their replacement, the appliance can be reassembled easily and is then ready for operation.

According to a further development of the method of the invention affording an additional control possibility, the housing portion has an opening through which the connector base extends with the two contact pins when the housing portion is mounted on the housing structure. It is a further advantage that the connector base has on one side detent means or tenons displaceable against actuating forces, which are adapted for locking engagement with mating notches provided in the plug mounting structure or the step. Furthermore, it is advantageous that the notches are of different depths and the terminal lugs are angled, the one arm of the terminal lugs being fixedly coupled to the plug mounting structure or the contact pins, while the other arm is received in a slotted opening provided in the housing portion. In an embodiment of the invention, the connector base has at its end at least one slotted recess for receiving an actuator, the terminal lugs being destroyed by rotation of the connector base.

Finally, in a preferred embodiment of the invention, rotation of the connector base causes movement of the detent means provided on the connector base against the terminal lugs, severing them. In this arrangement, it is an advantage that next to the notch receiving the tenons a recess in circular-arc shape is provided on the end surface of the step, the terminal lug being placed over this recess and the tenon being guided thereon.

Further features of the present invention will be set out and illustrated in the subclaims, the description and the Figures, it being understood that all single features and all combinations of single features are essential to the invention.

While an embodiment of the present invention is illustrated by way of example in the accompanying drawings, the invention is not intended to be limited to this specific embodiment. In the drawings.

Figures 1, 2:
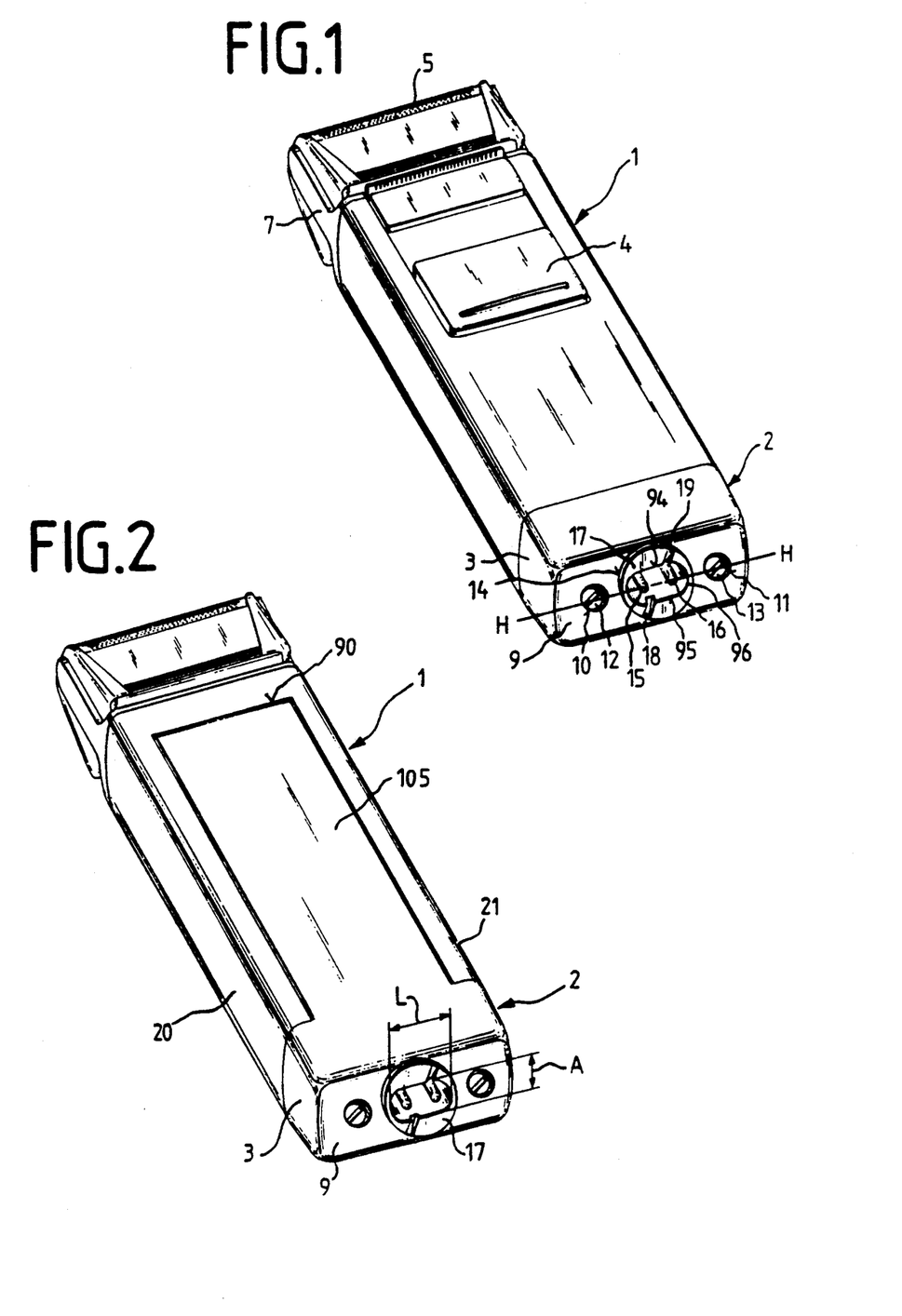
FIG. 1 is a perspective view of a shaving apparatus with a shell-type housing portion.
FIG. 2 is a perspective view of a shaving apparatus illustrating another embodiment thereof.

Referring now to the drawings, FIG. 1 shows an electrical appliance, in particular a dry shaving apparatus, comprising a housing structure 1 and a cup-shaped housing portion 2, 3, an ON/OFF switch 4 slidably arranged on the front panel of the housing structure 1 for energization of the electric drive received in the housing structure 1, and a shaving head 5 provided at the upper end of the housing structure 1.

The housing structure 1 (FIG. 3) is comprised of a shell 8 surrounding a housing frame 7 and a detachable housing portion 3 holding the shell 8 against an abutment wall 6 provided on the housing frame 7, the housing portion 3 being of a cup-shaped configuration conformed to the outer contour of the shell 8. The housing portion 3 includes a bottom wall 9 providing two round cutouts 10, 11 receiving screws 12, 13 therein, as well as a cylindrical opening 14 in which a connector base 17 surrounding two contact pins 15, 16 is arranged so as to protrude from the opening 14. Two slotted recesses identified by reference numerals 18 and 19 are formed in the forward end of the connector base and serve to receive a coin for the purpose of turning the connector base.

Figure 3:
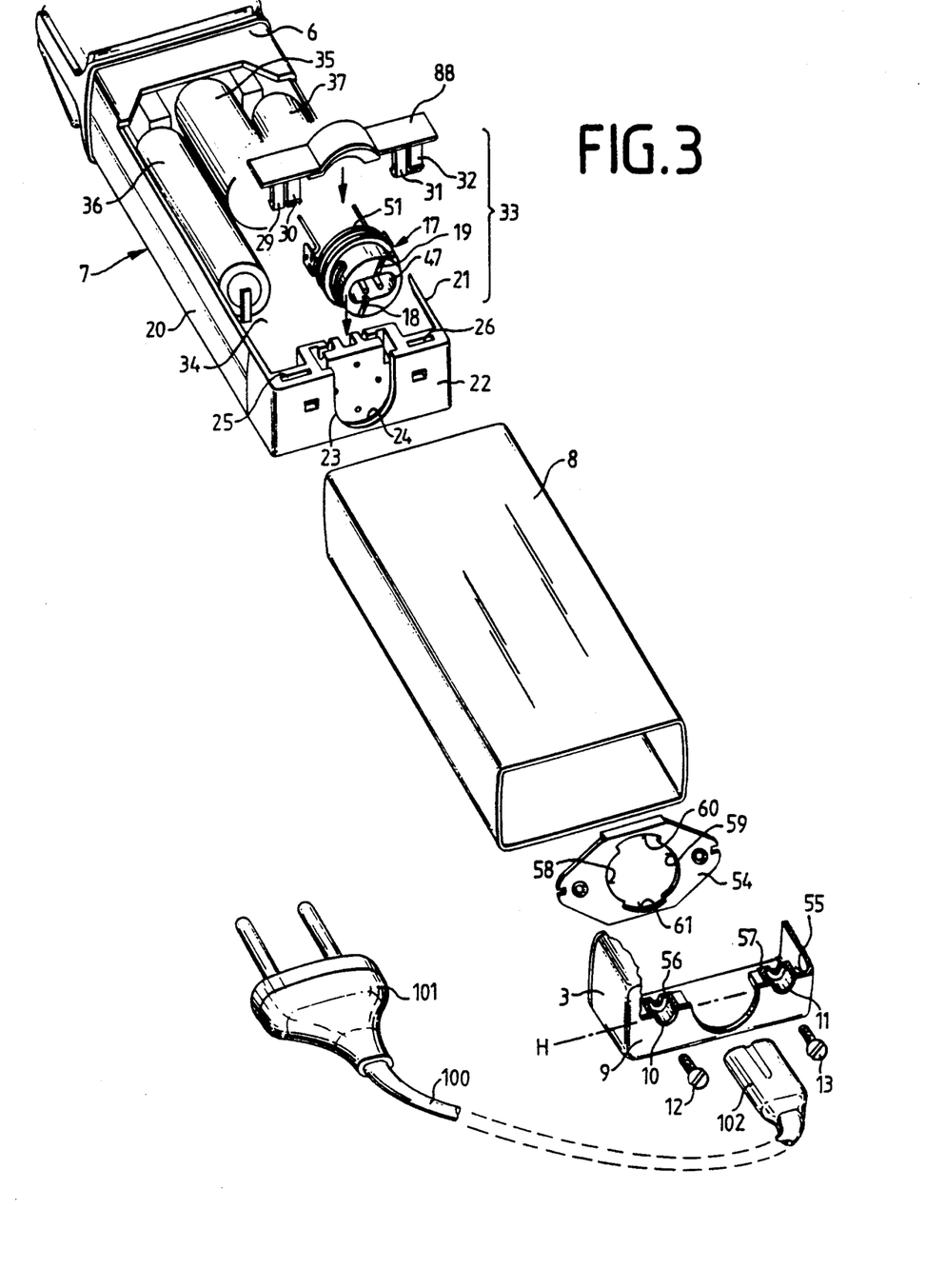
FIG. 3 is an exploded view of an opened shaving apparatus with the housing portion detached, showing a plug mounting structure and a connector base which are part of an appliance plug, as well as a power cord.

A power cord necessary for charging storage cells 36, 37 arranged on the housing frame 7 or, alternatively, for operating the electrical appliance or shaving apparatus directly on the line is assigned reference numeral 100. The power cord 100 has at its one end a conventional attachment plug 101 and at its other end a connector 102 intended to be coupled to the electrical appliance. The connector 102 has its outer shape conformed to the contour of a receiving aperture 47 of the connector base 17, which aperture is determined by two planar side walls 94, 95 extending in the horizontal direction H (FIGS. 1, 4) and two round end walls 96 interconnecting the side walls in vertical direction, with the relative distance A (FIG. 2) of the horizontal side walls being substantially smaller than the relative distance L of the round end walls 96. Provided in the receiving aperture 47 between the side walls extending in the horizontal direction H are two contact pins 15, 16 extending in a plane parallel to the side walls. In electrical appliances of this type including, for example, shavers, toothbrushes and the like, the relative distance of the contact pins plus the diameter of one of the contact pins 15, 16 corresponds approximately to the relative distance A of the horizontal side walls (FIGS. 2, 3).

The housing structure 1 (see FIG. 3) is essentially comprised of two longitudinal end walls 20, 21 interconnected at the end remote from the abutment wall 6 by a wall 22. The end walls 20, 21 and the wall 22 enclose a printed circuit board 34 on which an electric drive motor 35, rechargeable storage cells 36, 37 as well as further electric components of an electric circuitry are mounted.

Figure 4:
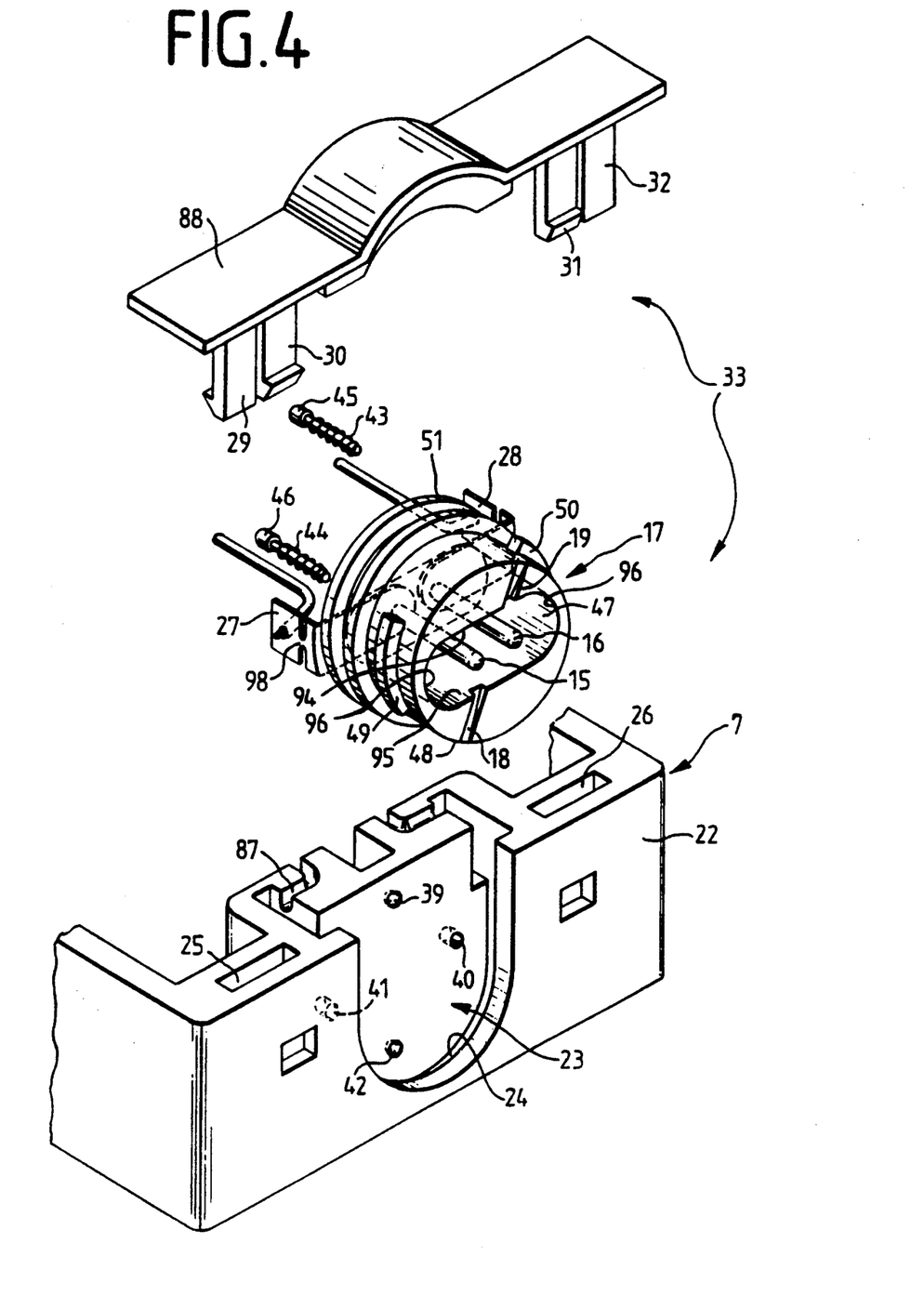
FIG. 4 is an exploded view of parts of the appliance plug and the housing.
Figure 5:
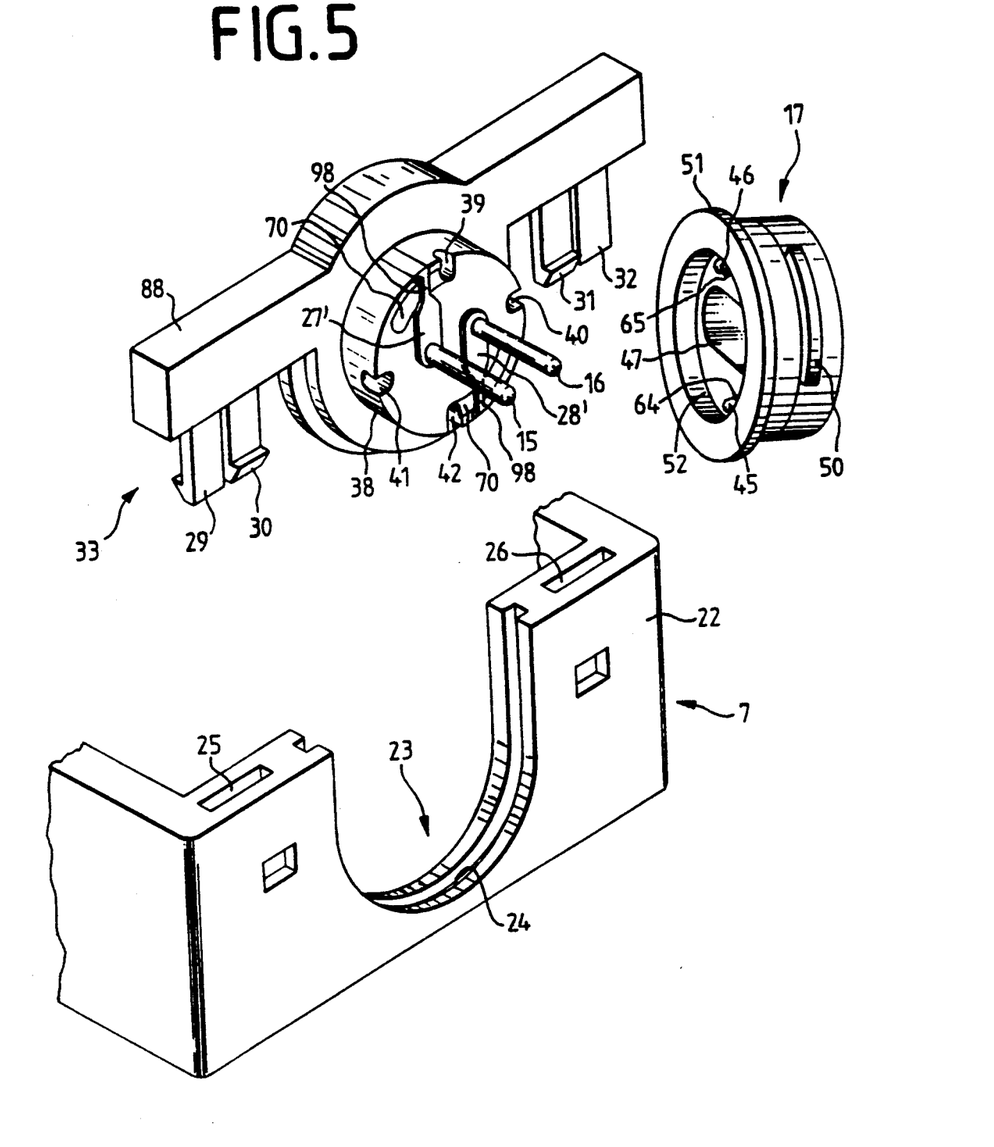
FIG. 5 is a perspective view of the plug mounting structure in which the connector base is detached.

The wall 22 (FIGS. 3 to 5) has an upwardly open or U-shaped cutout 23 in which a partly circumferential groove 24 is provided, as well as two insert openings 25, 26 for latching engagement with hooks 29, 30, 31, 32 of a plug mounting structure 33. Formed on the plug mounting structure 33 is a cylindrical step 38 (FIG. 5) in which four detent locations or notches 39, 40, 41, 42 are integrally formed for engagement by tenons 45, 46 arranged in the rotary connector base 17 and movable against the pressure of springs 43, 44. The contact pins 15, 16 fixedly attached to the plug mounting structure 33 have their one ends connected in conducting relationship via terminal lugs 27, 28; 27', 28' with an electric circuitry of the shaving apparatus, their other ends protruding into the receiving aperture 47 of the rotary connector base 17 which is intended to receive a connector 102 of the power cord 100. Each terminal lug 27, 28, 27', 28' ∝ includes a rupture joint 98 (FIGS. 4 and 5). Terminal lugs 27, 28 are received in slotted openings 87 in the FIG. 4 embodiment; and terminal lugs 27', 28' overlie arc-shaped recesses 70 in the FIG. 5 embodiment. The plug mounting structure 33 and the connector base 17 provide an appliance plug in the electrical appliance.

The connector base 17 (FIG. 5) is of a cylindrical configuration having formed on its cylindrical outer surface 48 two diametrically arranged latching tabs 49, 50 and a circumferential annular shoulder 51. At its end close to the plug mounting structure 33, the connector base 17 is provided with a cylindrical recess 52 (see FIG. 5) of a diameter conformed to the diameter of the cylindrical step 38 of the plug mounting structure 33, such as to ensure a perfect holding and guiding function on the cylindrical step 38 in the course of the rotary movement of the connector base 17. After the connector base 17 is seated on the cylindrical step 38 of the plug mounting structure 33, the two components are inserted in the cutout 23 as an assembly. As this occurs, the latch hooks 29 to 32 are pushed into the respective insert openings 25, 26 in the wall 22, while at the same time the annular shoulder 51 of the connector base 17 is seated inside the groove 24 in the U-shaped cutout 23 of the wall 22. In this manner, the plug mounting structure 33 and the connector base 17 are coupled to the wall 22 of the housing frame 7. With the parts locked in the desired position, the connector base 17 is rotatable relative to both the plug mounting structure 33 and the wall 22.

In the embodiment illustrated in FIG. 3, the detachable cup-shaped housing portion 3 is provided with a locking plate 54 having an opening 53 and secured by means of the screws 12, 13 to spacing means 56, 57 formed integrally on the inside 55 of the bottom wall 9 in diametrically opposite arrangement. The opening 53 in the locking plate 54 is formed by two diametrically opposite sectoral projections 58, 59 and two diametrically opposite sectoral cutouts 60, 61 separating the projections. The sectoral projections 58, 59 cooperate with the spacing means 56 and 57 to form two detent means when the locking plate 54 is fastened by the screws, whilst the sectoral cutouts 60 and 61 disposed in the locking plate 54 at a spacing of 90° relative to the projections are dimensioned and configured such as to enable the latching tabs 49 and 50 integrally formed on the connector base 17 to be passed through the cutouts 60 and 61.

With the connector base 17 and the plug mounting structure 33 in coupled condition with the wall 22, the horizontally extending side walls 94, 95 of the receiving aperture 47 are parallel with the bottom end of the housing portion 3 of the housing structure 1, as illustrated in FIGS. 1 and 2. With the connector base 17 oriented in this manner, the locking plate 54 is slipped over the latching tabs 49, 50 of the connector base 17 and, using a turning motion, is moved into a position in which the latching tabs 49, 50 cooperate with the sectoral projections 58, 59 to assume a latched position. The housing portion 2 is subsequently fastened to the locking plate 54 by means of the screws 12, 13.

FIG. 4 shows an exploded view of plug mounting structure 33, tenons 45, 46 with springs 43, 44, connector base 17, and the bottom part of the housing frame 7. To receive the tenons 45, 46 and the springs 43, 44, two blind-end bores 64, 65 are provided in the connector base 17 in diametrically opposite arrangement. Further details of the configuration of plug mounting structure 33 and connector base 17 are illustrated in FIG. 5. Provided on the plug mounting structure 33 is the cylindrical step 38 serving a guiding and supporting function for the connector base 17 on which a cylindrical recess 52 mating with the step 38 is provided. In the assembled condition of plug mounting structure 33 and connector base 17, the contact pins 15, 16 attached to the plug mounting structure 33 on a plane H in horizontal direction protrude into the receiving aperture 47 extending with its longitudinal extent equally in the horizontal direction. Integrally formed in the cylindrical step 38 are four detent locations or notches 39 to 42 for receiving the two tenons 45, 46 spring-loaded in the connector base. The diametrically opposite detent locations 39 and 42 are of little depth, being dimensioned such as to ensure ready engagement and disengagement of the rounded ends of the tenons 45 and 46, whilst the diametrically opposite detent locations 40 and 41 are configured as blind-end bores of a depth making disengagement of the tenons 45, 46 very difficult or preventing it entirely once they are in locking engagement therein. In combination with the tenons 45, 46 held therein by locking engagement, the detent locations 40 and 41 thus serve as abutment stops for limiting the range of rotation of the rotary connector base 17.

As a result of the narrow, elongate shape of the receiving aperture 47 of the connector base 17 and the suitably adapted arrangement of the contact pins 15, 16 fixedly attached to the plug mounting structure 33 and the mating shape and configuration of the connector 102 of the power cord 100, the connector base 17 cannot be turned when the connector 102 is coupled to the connector base 17, accordingly preventing the detachable housing portion 2 or 3 from being removed from the housing 1.

Figure 6:
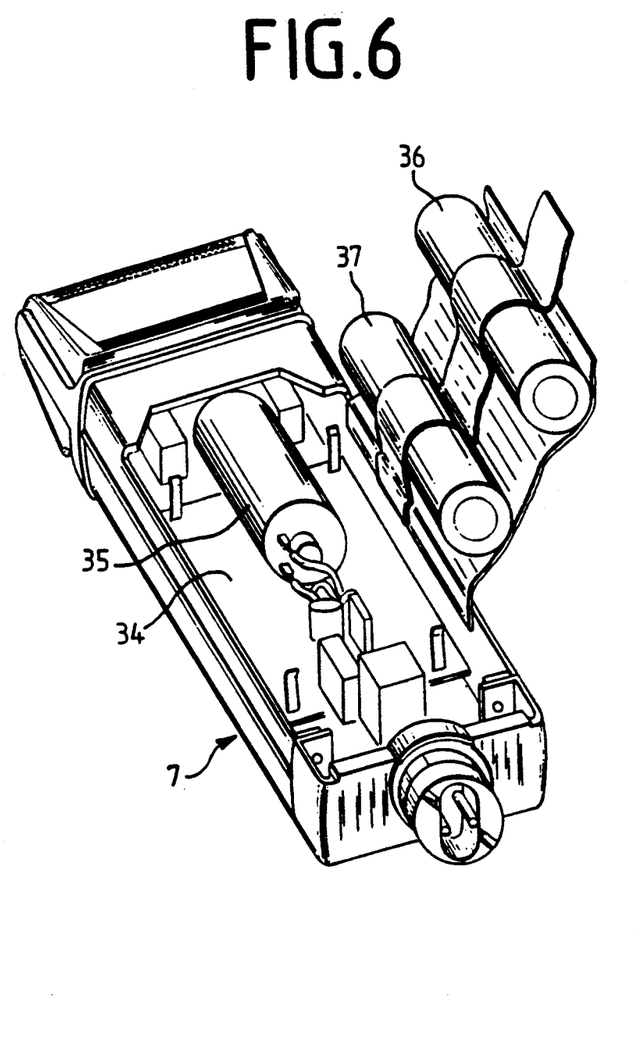
FIG. 6 is a view of an opened shaving apparatus in which the rechargeable storage cells are swung open.

To be able to detach the housing portion 2, 3 from the housing 1, it is necessary to pull the connector 102 of the electric power supply cord 100 from the connector base 17 of the electrical appliance. By subsequent turning of the connector base 17 using, for example, a coin inserted in the slotted recesses 18 and 19 of the connector base 17, the latching tabs 49, 50 located behind the sectoral projections 58, 59 can be disengaged from their latched positions (see FIG. 6) and the housing portion 2 or the wall member 105 with the housing portion 2 can be removed from the connector base 17. As connector base 17 is turned in the FIG. 4 embodiment, rupture joints 98 of terminal lugs 27, 28 are broken, interrupting the power supply connection. Similarly, in the FIG. 5 embodiment, as connector base 17 is turned, tenons 45, 46 move in arc-shaped grooves 70 and break rupture joints 98 of terminal lugs 27', 28', similarly interrupting the power supply connection between contact pins 15, 16 and electrical circuitry mounted in housing structure 1. Then the shell 8 can be slipped off from the housing frame 7, enabling the storage cells 36, 37 thus exposed to be swung open for subsequent removal or replacement, as shown in FIG. 6. According to FIG. 4, the latch hooks 30 to 32 are disposed on a carrier 88 adapted to be fixedly attached to the plug mounting structure 33 when the carrier 88 and the connector base 17 are assembled, whilst the carrier 88 of FIG. 5 may be formed integrally with the plug mounting structure 33.

In the embodiment illustrated in FIGS. 3 and 4, the range of rotation of the connector base 17 is limited by means of the detent locations 39 to 42 on the plug mounting structure 33 and the tenons 45 and 46 locking into these locations as well as by the configuration of the detent locations 39 to 42 illustrated and described with reference to FIGS. 4 and 5. The range of rotation in clockwise or counterclockwise direction being about 90°, the possibility of positive coupling engagement between the connector 102 and the connector base 17 is precluded when the connector base 17 is in unlocked position (FIG. 6). Because in the unlocked position of the connector base 17 its tenons 45 and 46 are in locking engagement with the deeper detent locations 40 and 41, the possibility of further rotation of the connector base 17 in clockwise or counterclockwise direction is eliminated also in cases where the housing portion 2 including the shell 8 are removed.

As becomes apparent from FIG. 2, the cup-shaped housing portion 2 has on its one side a freely extending wall member 105 of a width somewhat reduced compared to the corresponding side of the housing 1, the wall member being insertable into an elongate cutout 90 provided in the side of the housing 1.

We claim:

1. An electrical appliance comprising housing structure for accommodating at least one functional component and at least one rechargeable storage cell cooperating with said functional component, said housing structure including a releasable housing portion for providing access to said storage cell, storage cell charging circuitry and appliance plug structure on said appliance, said appliance plug structure comprising connector base structure with a receiving aperture and contact pin structure provided in said receiving aperture for engagement with a mating connector of a power cord for supplying electrical power to said storage cell, at least one of said connector base structure and said contact pin structure being rotatably mounted relative to said housing structure, latch element structure on said connector base structure cooperating with said releasable housing portion, and structure responsive to rotation of said one structure for releasing said housing portion and interrupting power supply structure in said housing structure.

2. The electrical appliance of claim 1 wherein said connector base structure is rotatable relative to said contact pin structure.

3. An electrical appliance comprising housing structure for accommodating at least one functional component and at least one rechargeable storage cell cooperating with said functional component, said housing structure including a releasable housing portion for providing access to said storage cell, storage cell charging circuitry and appliance plug structure on said appliance, said appliance plug structure comprising connector base structure with a receiving aperture and contact pin structure fixedly disposed in said receiving aperture for engagement with a mating connector of a power cord for supplying electrical power to said storage cell, and at least one terminal lug having a rupture joint for connecting said contact pin structure to said storage cell, at least one of said connector base structure and said contact pin structure being rotatably mounted relative to said housing structure, latch element structure on said connector base structure cooperating with said releasable housing portion, and structure responsive to rotation of said one structure for interrupting power supply structure in said housing structure.

4. The electrical appliance of claim 1 wherein housing structure includes a housing frame, a first housing portion adapted to be mounted on said housing frame, and a second housing portion for completing said housing structure, at least one of said first housing portion and said housing frame receiving said connector base structure.

5. The electrical appliance of claim 4 wherein said housing structure includes an abutment wall and said second housing portion is configured as a shell adapted to be slipped onto said housing frame into abutment with said abutment wall.

6. The electrical appliance of claim 5 wherein said first housing portion has approximately the same outer contour as said shell, is of cup-shaped configuration, includes an opening for receiving a connector, and is adapted to be attached to the bottom end of said shell.

7. The electrical appliance of claim 6 wherein said housing structure includes an elongate cutout in one side thereof, and said cup-shaped housing portion has on one side a freely extending wall member of a width somewhat less than the width of said housing structure, said wall member being insertable into said elongate cutout.

8. The electrical appliance of claim 1 or 2 wherein aperture structure is provided at the bottom end of said housing structure said aperture structure being open at one side, and having an at least partially annular groove for receiving said contact pin structure in fixed relation and for receiving an annular shoulder of said connector base structure is rotatable relation.

9. The electrical appliance of claim 1 or 2 wherein annular step structure is fixedly arranged on said plug structure, and said connector base structure is rotatable within limits relative to said annular step structure.

10. The electrical appliance of claim 1 or 2 wherein said connector base structure is of cylindrical configuration and has at least one latching tab on its circumferential outer surface.

11. An electrical appliance comprising housing structure for accommodating at least one functional component and at least one rechargeable storage cell cooperating with said functional component, said housing structure including a releasable housing portion for providing access to said storage cell, storage cell charging circuitry and appliance plug structure on said appliance, said appliance plug structure comprising connector base structure with a receiving aperture, contact pin structure provided in said receiving aperture for engagement with a mating connector of a power cord for supplying electrical power to said storage cell, at least one of said connector base structure and said contact pin structure being rotatably mounted relative to said housing structure, locking plate structure seatable on the outer surface of said connector base structure, latch element structure on said connector base structure cooperating with said releasable housing portion, said locking plate structure having at least one opening with an enlargement configured to enable said locking plate structure to be slipped with said opening and said enlargement over said latching tab, and to be subsequently located in position behind said latching tab using a rotating motion of one of said connector base structure and said locking plate structure, and structure responsive to rotation of said one structure for interrupting power supply structure in said housing structure.

12. The electrical appliance of claim 1 wherein said releasable housing portion is connected with said locking plate structure by coupling means.

13. The electrical appliance of claim 1 or 2 wherein said releasable housing portion has an opening through which said connector base structure and said contact pin structure extends when said releasable housing portion is mounted on said housing structure.

14. The electrical appliance of claim 1 or 2 wherein said connector base structure includes detent structure displaceable against actuating forces, which is adapted for locking engagement with mating notch structure in said housing structure.

15. The electrical appliance of claim 14 wherein said notch structure includes a plurality of notches of different depths.

16. An electrical appliance comprising housing structure for accommodating at least one functional component and at least one rechargeable storage cell cooperating with said functional component, said housing structure including a releasable housing portion for providing access to said storage cell, storage cell charging circuitry and appliance plug structure on said appliance, said appliance plug structure comprising connector base structure with a receiving aperture and contact pin structure provided in said receiving aperture for engagement with a mating connector of a power cord for supplying electrical power to said storage cell, and a terminal lug with two arms, one arm of said terminal lug being fixedly coupled to said plug structure or said contact pin structure, and the other arm of said terminal lug being received in a slotted opening provided in said housing structure, at least one of said connector base structure and said contact pin structure being rotatably mounted relative to said housing structure, latch element structure on said connector base structure cooperating with said releasable housing portion, and structure responsive to rotation of said one structure for interrupting power supply structure in said housing in said housing structure.

17. An electrical appliance comprising housing structure for accommodating at least one functional component and at least one rechargeable storage cell cooperating with said functional component, said housing structure including a releasable housing portion for providing access to said storage cell, storage cell charging circuitry and appliance plug structure on said appliance, said appliance plug structure comprising connector base structure with a receiving aperture and contact pin structure provided in said receiving aperture for engagement with a mating connector of a power cord for supplying electrical power to said storage cell, and said connector base structure including at least one slotted recess for receiving an actuator, at least one of said connector base structure and said contact pin structure being rotatably mounted relative to said housing structure, latch element structure on said connector base structure cooperating with said releasable housing portion, and structure responsive to rotation of said one structure for interrupting power supply structure in said housing structure.

18. An electrical appliance comprising housing structure for accommodating at least one functional component and at least one rechargeable storage cell cooperating with said functional component, said housing structure including a releasable housing portion for providing access to said storage cell, storage cell charging circuitry and appliance plug structure on said appliance, said appliance plug structure comprising connector base structure with a receiving aperture and contact pin structure provided in said receiving aperture for engagement with a mating connector of a power cord for supplying electrical power to said storage cell, and terminal lug structure that is destroyed by rotation of said connector base structure, at least one of said connector base structure and said contact pin structure being rotatably mounted relative to said housing structure, latch element structure on said connector base structure cooperating with said releasable housing portion, and structure responsive to rotation of said one structure for interrupting power supply structure in said housing structure.

19. The electrical appliance of claim 18 and further including detent structure on said connector base structure, and wherein rotation of said connector base structure causes movement if said detent structure against said terminal lug structure to sever it.

20. The electrical appliance of claim 18 and further including a circular-arc shape recess in said appliance plug structure and a tenon carried by said one structure, said terminal lug structure being placed over said recess with said tenon being guided thereon.

* * * * *